June 4, 1946. H. A. COOK, JR 2,401,550
METHOD OF APPLYING PLASTIC COATINGS TO FLEXIBLE STRIPS AND THE LIKE
Filed June 16, 1943 3 Sheets-Sheet 2

INVENTOR.
H. A. Cook, Jr.
BY
Robert Cobb
ATTORNEYS.

June 4, 1946.  H. A. COOK, JR  2,401,550
METHOD OF APPLYING PLASTIC COATINGS TO FLEXIBLE STRIPS AND THE LIKE
Filed June 16, 1943  3 Sheets-Sheet 3
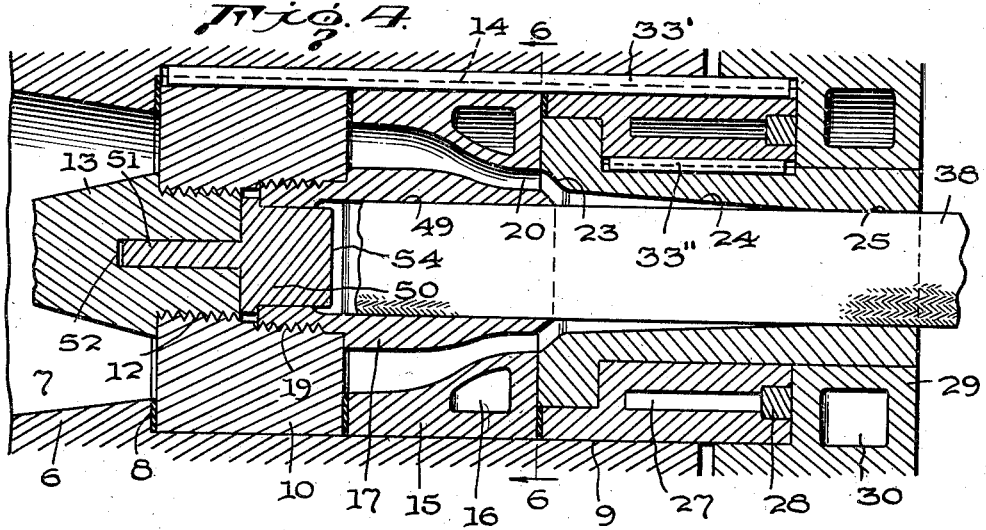
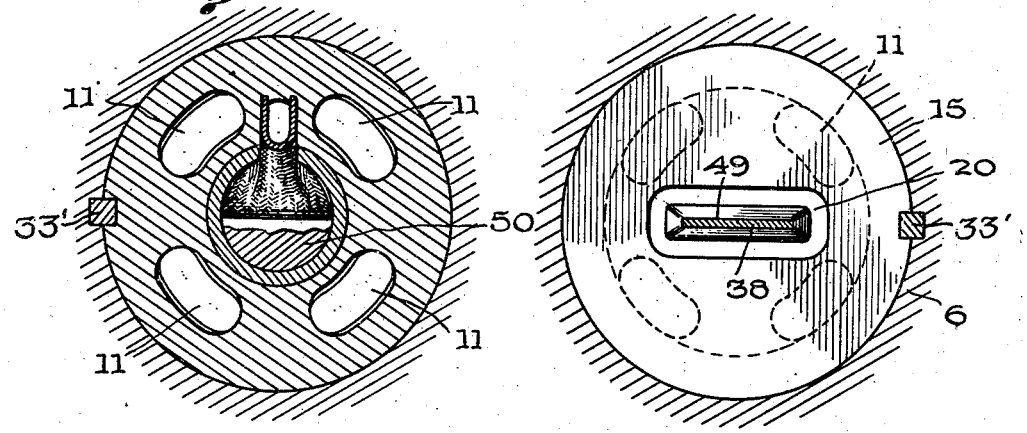
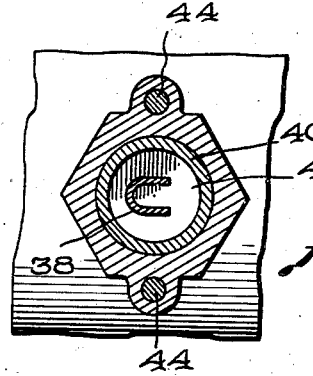
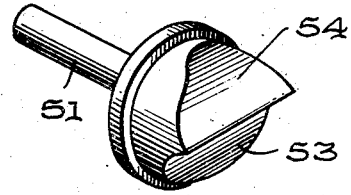
INVENTOR.
BY H. A. Cook, Jr.
ATTORNEYS.

Patented June 4, 1946

2,401,550

UNITED STATES PATENT OFFICE 2,401,550

METHOD OF APPLYING PLASTIC COATINGS TO FLEXIBLE STRIPS AND THE LIKE

Herbert Alton Cook, Jr., Auburn, N. Y., assignor to Auburn Button Works, Inc., Auburn, N. Y., a corporation of New York Application June 16, 1943, Serial No. 491,078

2 Claims. (Cl. 18—59)

This invention appertains to an improved method of applying plastic coatings to flexible strips, webs, tapes, and other similar articles and shapes.

In the methods and machines heretofore employed in applying plastic coatings to articles of the aforementioned character, considerable difficulty has been met in obtaining a firm adhesion between the plastic coating and the base material onto which it is applied, and in addition, it has been practically impossible to apply a coating of uniform thickness, particularly where the coating completely surrounds the base material. These problems are of considerable importance in the application of decorative and/or protective coatings to articles of wearing apparel, such as belts, braces (suspenders), bands, and the like, which are of greater transverse width than thickness, with the result that the plastic coating is not equally distributed about the article by reason of the lack of pressure balance on the plastic as it passes through the usual extrusion die.

Still another serious problem presented by the conventional plastic coating machines is the tendency of the plastic material to deteriorate or decompose by backing or piling up in bends or turns through which the plastic is directed through the extrusion machine and die, with the consequent formation of "dead spots." This problem is especially troublesome in those machines which are characterized by a cross-feed, that is, where the plastic makes substantially a 90° turn in the extrusion machine itself, or where the plastic is fed onto an article which is moving transversely to the direction of flow of the plastic. Some of the plastics, particularly vinyl chloride, decompose rather rapidly if allowed to stand or pile up in the coating machine or die, even for a few minutes, and when decomposition has taken place, the plastic becomes dark in color or streaked, with consequent darkening or streaking of any fresh plastic which may be passing through the machine adjacent to the decomposed dead spots. Obviously, this produces a very inferior and unsightly coating, wholly unfit for decorative purposes in the case of articles of wearing apparel.

With the foregoing principal difficulties in view, among many others not specifically mentioned, I have provided a new and improved method which serves to preliminarily remove moisture and air from the interstices and indentations of the article or base material to be coated with plastic, as obtained by preheating the base material, followed by the application of vacuum to the material before the plastic coating is applied thereto. These steps, together with a progressively increasing application of pressure onto the plastic coating after the coating is applied to the base material, as obtained by a tapered finishing die, insure the positive forcing of the plastic into the base material, in the case of woven fabric, and in any case, consequent firm adhesion between the base material and the plastic, all without the production of air bubbles or air pockets which are so commonly present in such plastic coated articles.

Another object of my invention is the provision of an improved method for producing a "streamlined" flow of plastic onto the base material to be coated, and for balancing the pressure throughout the plastic stream just before it is applied onto the base material, thereby permitting an exceedingly close regulation of the flow of plastic, with consequent application of the plastic in uniform thickness about all sides of the base material. With regard to the "streamlining" of the plastic flow, this also serves the advantage of reducing resistance to flow and substantial elimination of dead spots and consequent decomposition of the plastic.

A further object of my invention is to facilitate the feed of normally flat strips, webs, belts and the like, of flexible material, by initially curling the material transversely, preferably after the removal of moisture and air therefrom as previously mentioned, to enable the same to be passed into an extrusion die without substantial interference with the flow of the plastic through the die. By curling the base material, wider strips or webs can be successfully accommodated than would otherwise be possible with an extrusion die of given dimensions, and without weakening the die or other forming head.

Ancillary to the aforementioned object, my invention additionally contemplates the provision of an ironing or forming die which flattens and smooths out the initially curled strip material, and thereafter guides it in a straight path which is substantially parallel with the flow of the plastic coating material which is to be ultimately applied thereto.

A still further object of my invention is to provide an extrusion die or forming head which is so constructed as to produce a substantially self-cleaning action upon the base material to be coated should any plastic back up into the guides, and also so constructed as to minimize the backing up of the plastic material.

Other and further objects and advantages of the invention will be hereinafter described, and the novel features thereof defined by the appended claims.

In the accompanying drawings:

Figure 1 is a view in vertical section through an extrusion die or forming head constructed according to my invention, the same being shown as applied to a conventional plastic extrusion machine of the cylinder and feed-screw type, as in carrying out my improved method of applying plastic coatings to flexible strips and the like;

Figure 4 is a horizontal sectional view taken on the line 4—4 of Figure 2;

Figure 5 is a sectional view taken on the line 5—5 of Figure 1, to illustrate the uncurling of the initially curled strip material as it enters the ironing and guiding die;

Figure 6 is a sectional view taken on the line 6—6 of Figures 1 and 4 respectively, near the forward end of the ironing die;

Figure 1:
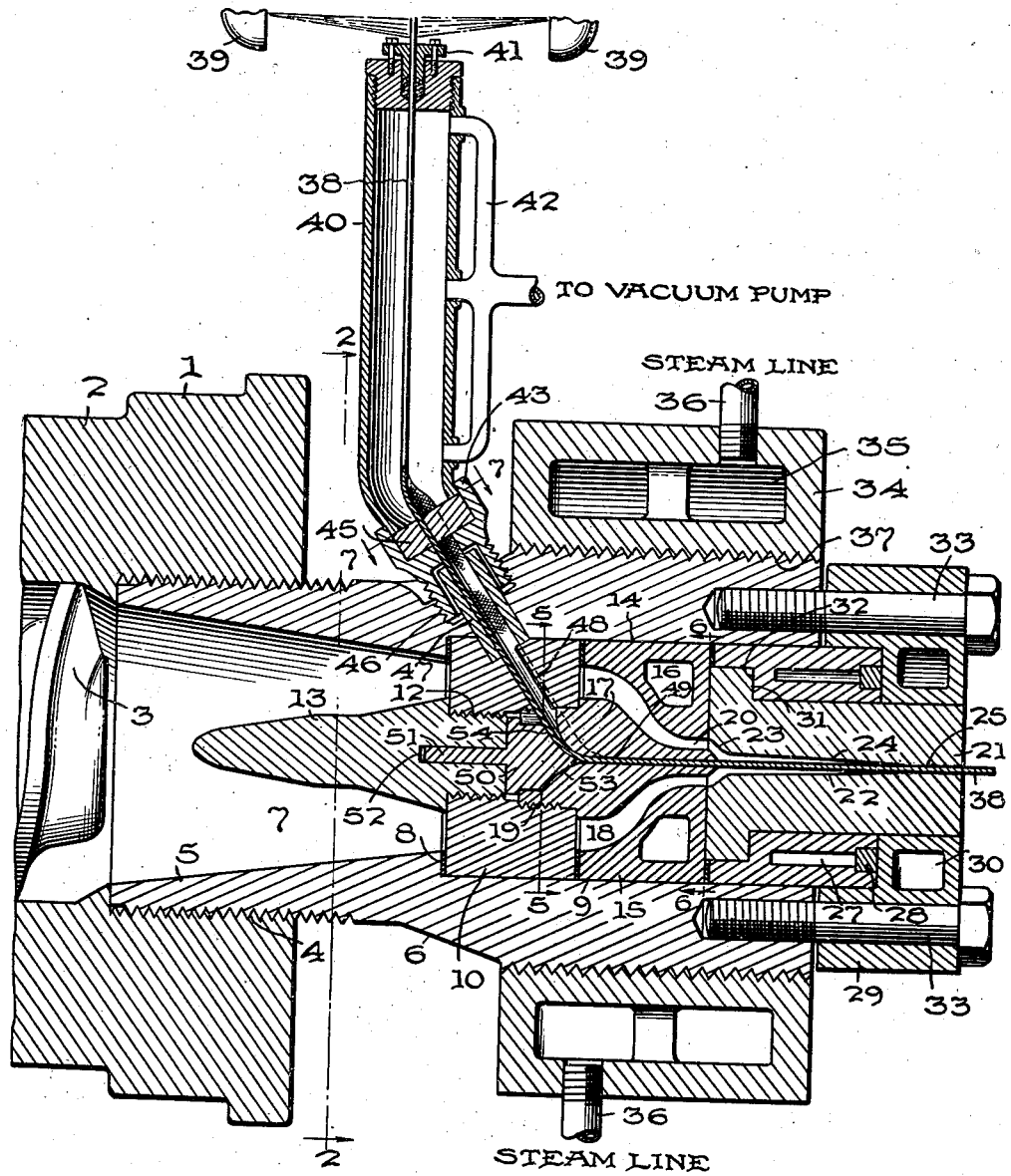
Figure 2:
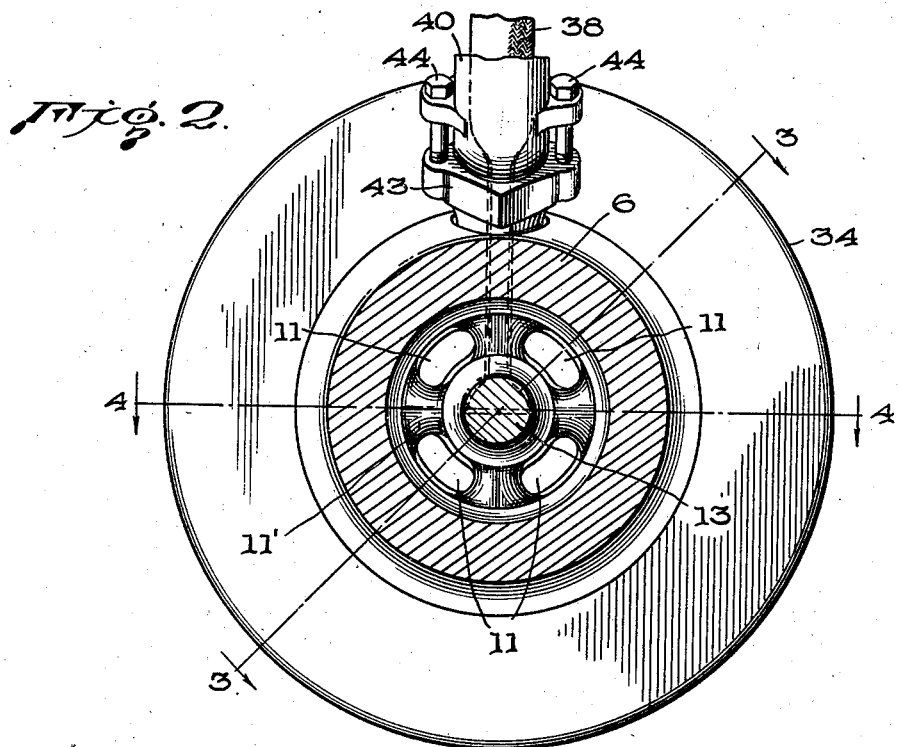
Figure 2 is a sectional view taken on the line 2—2 of Figure 1, transversely to the section of Figure 1.
Figure 3:
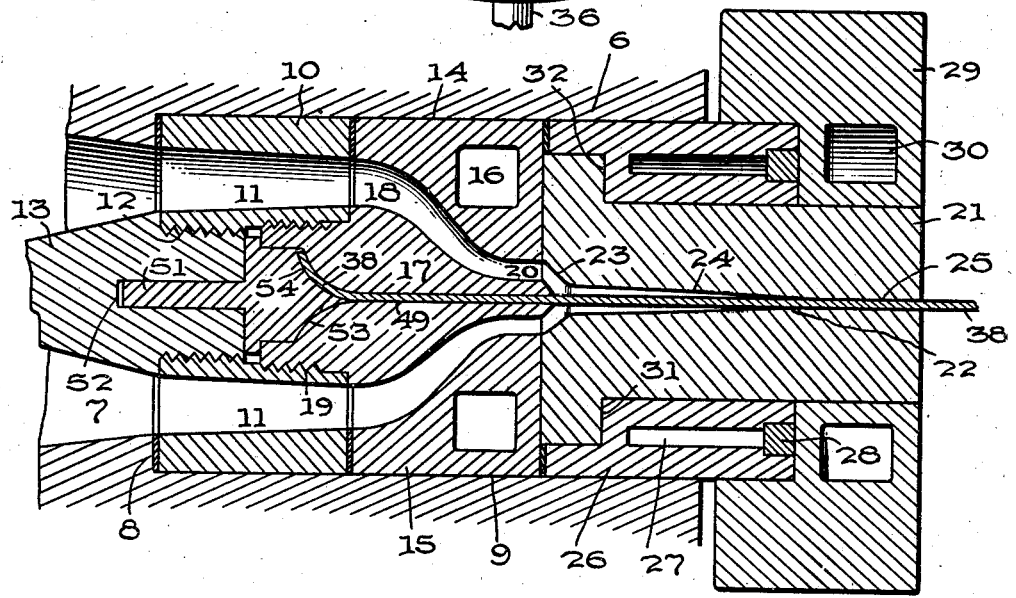
Figure 3 is a sectional view taken on the line 3—3 of Figure 2, and showing on a somewhat enlarged scale, the details of the streamlined plastic passages through the extrusion die or forming head, together with the ironing and guiding die and the finishing die, with their associated heating chambers.

Figure 7 is a sectional view taken on the line 7—7 of Figure 1, showing the strip curling guide which initially imparts a transverse curl to the strip material before it passes into the extrusion die or forming head; and Figure 8 is a perspective detail view of the backstop shoe or plug which cooperates with the ironing or guiding die in reopening and entering the strip material into the ironing die, and otherwise prevents the plastic from backing up into the strip entering end of the forming head.

Like reference characters designate corresponding parts in the several figures of the drawings, wherein 1 designates, in fragmentary form, the discharge end of a conventional extrusion machine which may be of any suitable construction. As illustrated in Figure 1 of the drawings, said extrusion machine includes the usual plastic feeding cylinder 2 through which the plastic is fed axially by the usual screw 3. The discharge end of the cylinder 2 is preferably threaded at 4 to receive a correspondingly threaded end 5 of a tubular shell 6 forming part of an extrusion die or forming head.

As will be best seen from Figure 1 of the drawings, the end of the shell 6 which is threadedly connected to the cylinder 2 is longitudinally bored to provide a belled or tapered chamber 7 through which the plastic material enters the extrusion die or forming head from the feed-screw 3. At the forward end of the tapered chamber 7, the tubular shell 6 is provided with an interior annular shoulder 8, beyond which the shell is bored cylindrically to a continuously uniform size to the extreme forward end of the shell, as indicated at 9.

Mounted in the bore 9 and abutting against the shoulder 8 is a spider 10 which is provided with a plurality of passages 11 extending axially through the spider, said passages being spaced equidistantly from each other about the central axis of the spider, and being located in outwardly spaced relation to said central axis, near the outer margin of the spider. The end of the spider next to the feed-screw 3 is centrally bored and threaded, as at 12, to receive a correspondingly threaded end on a tapered point 13 which projects into the belled bore or chamber 7, as will be best understood from reference to Figure 1 of the drawings. This tapered point 13 serves to divide the plastic passing axially through the chamber 7, and to streamline the plastic as it approaches the spider 10 where it enters into the spaced passages 11 in the latter. The webs 11' between the passages 11 are preferably bevelled or tapered towards each passage at the plastic entering ends of the latter, to aid in smoothly directing the plastic into the passages through the spider.

Positioned forwardly of the spider 10 in the bore 9 is a combined ironing and guiding die 14 which is made up of an outer shell or bell-piece 15, preferably cored out at 16 to provide a steam chamber, and an inner split die 17 inwardly spaced from the outer bell 15 to form an annular plastic passage 18. The split die 17 is preferably pinned together and screwed into the end of the spider 10 opposite to the tapered point 13, which opposite end is threaded as at 19.

As will be understood from reference to Figures 1 to 4 inclusive, the annular space 18 formed between the outer shell or bell-piece 15 and the inner die or guide 17 receives the plastic material as it passes through the passages 11 in the spider 10, and continues the streamlining of the plastic flow. Due to the tapering of the plastic passages and chambers, the cross section of the plastic stream progressively reduces as the plastic advances towards the forward end of the forming head. In this connection, the shaping of the outer bell 15 and the inner die or guide 17 is quite important from the standpoint of the streamlining effect upon the plastic material, and also from the standpoint of balancing the pressure of the plastic throughout the plastic stream. To the latter end, the forward end of the annular passage 18 takes the form of a straight-away, as at 20, to allow the pressure to become equal all around the plastic stream before it leaves this passage.

At the forward end of the combined ironing die and guide 14, there is mounted in the bore 9 of the tubular shell 6 a finishing die 21 having an axial passage 22 extending therethrough. The rearward end of this passage 22 is belled out to form an annular shoulder, as at 23, which lies directly forwardly of the discharge end of the straight-away passage 20 in the combined ironing and guiding die 14. Thus, this shoulder contributes to the balancing of the plastic pressure before it leaves the passage 20, by preventing the plastic from flowing directly into the passage 22 in the finishing die 21. In other words, the passage 20 is spaced outwardly somewhat beyond the center of the passage 22 in the finishing die, and by virtue of the provision of the shoulder 23 which is disposed forwardly of the passage 20, the flow of the plastic material is held back slightly in the straight-away passage 20 until the pressure on the plastic has had an opportunity to become perfectly balanced about the entire plastic stream. Thereafter, the plastic passes from the belled end 23 of the passage 22, into a portion of the passage 22 which has a long taper, as indicated at 24. Beyond the tapered portion 24, the passage 22 is uniform, as indicated at 25. The purpose of this construction of the passage 22 just described will hereinafter more fully appear.

Surrounding the finishing die 21 is a collar 26 which is preferably milled out or cored out at 27 and closed at its forward end by a sealing ring 28 to form a steam chamber. An end plate 29, likewise preferably cored out as at 30 to provide an additional steam chamber, abuts against the outer end of the collar 26 which is provided at its rearward end with a shoulder 31 abutting against a corresponding shoulder 32 on the finishing die 21. Bolts 33, passing through the end plate 29 and threadedly received in the outer end of the tubular shell 6, serve to clamp the end plate 29 snugly against the collar 26 and finishing die 21, this clamping action also serving to firmly secure the ironing die and guide 14 and the spider 10 in their assembled relation as previously described. Keys 33' and 33" may be provided to maintain accurate registry of the die parts when assembled, as shown in Figure 4.

In order to more effectively heat the extrusion die or forming head, should additional heat other than is afforded by the steam chambers 16, 27 and 30 respectively, be required, the tubular shell 6 may be provided with an outer collar or steam jacket 34, which is suitably cored out to provide additional steam chambers 35 having communication with the steam lines 36. To facilitate the application of the steam jacket 34 onto the tubular shell 6, the forward end of the shell is preferably threaded, as at 37, for cooperation with the internally threaded bore of the steam jacket, thus permitting the steam jacket to be readily removed at will.

Having described the general features of the extrusion die or forming head, with particular regard for the flow of plastic therethrough, there remains to be described the feed of the article or base material to be coated with the plastic. As will be best seen from reference to Figure 1 of the drawings, the article or base material comprises, for the purposes of this illustration, a flexible strip or web of woven fabric, but it is to be understood that my invention is not limited thereto. Likewise, while the strip has been shown in a form which is rectangular in outline and considerably wider than it is thick, I do not intend to be limited to the particular dimensions or shape illustrated in the drawings, since other articles of other sizes and shapes may be similarly coated with plastic by suitable changes in the proportions and shapes of the parts of the extrusion die or forming head.

With the foregoing brief introduction as to the character of the material or article to be coated with plastic, it will be understood that the flexible strip material, designated 38, is fed from a suitable source, not shown, and preferably passes between opposed banks of infra-red ray lamps, diagrammatically illustrated at 39, 39, by means of which the strip is pre-heated and thoroughly dried out to remove any moisture which may be present therein. After this preheating and moisture-removing operation, the strip passes into a vacuum tube 40, which may have a tight fitting gasket 41, or other sealing means, closely conforming to the shape of the strip, at the upper end of the tube. At intervals along the tube 40, a manifold 42 is connected thereto, and the manifold is in turn connected to a vacuum pump (not shown) by means of which an effective vacuum will be drawn to remove any air which is present in the indentations or interstices of the strip 38. By reason of the connection of the manifold 42 to the tube 40 at intervals along the length of the latter, a relatively high vacuum will be obtained by the time the strip reaches the inner end of the tube, even though some air may enter past the gasket or seal 31 at the outer end of the tube. The inner end of the tube 40 fits into the upper end of a nipple 43, which may be firmly clamped thereto by the clamping bolts 44, best seen in Figure 2.

Disposed in the upper end of the nipple 43 at the bottom of the vacuum tube 40 is a form or curling die 45 through which the strip 38 passes, and by means of which the strip is curled from a normally flat form into a generally V-shaped or tubular form, as best shown in Figure 7. Suitable gaskets or other seals (not shown) may be disposed respectively above and below the form 45 to prevent air from being drawn into the vacuum tube at the joint between the vacuum tube and the nipple 43.

The lower end of the nipple 43 is threadedly received in an opening 46 provided therefor in the wall of the tubular shell 6. From the nipple 43 projects downwardly a hollow bolt 47 concentric with the axis of the nipple, said hollow bolt fitting in a bore through the wall of the tubular shell 6, extending at an angle of approximately 32° from the vertical. Coextensive with the bore through the hollow bolt 47, and forming a continuation thereof, is another bore 48 formed in the solid web of the spider 10, between an adjacent pair of plastic passages 11. Thus, the flexible strip 38, after passing through the form or die 45, continues in its transversely curled or tubular form through the hollow bolt 47 and the bore 48, beyond which it comes into engagement with the rearward end of the split ironing die or guide 17. This end of the ironing die or guide 17 is so shaped as to cause the curled strip 38 to be opened up and fed in a restored flat condition through a passage 49 corresponding in shape to the normally flat shape of the strip and extending longitudinally through the die 17. The restoration of the flat shape of the strip 38 is aided by the use of a special backstop shoe or plug 50, having a pin 51 projecting from its rearward side into a corresponding opening 52 formed in the tapered point 13. The forward end of the shoe, at its lower side, closely fits the rear end of the lower half of the split die 17, as indicated at 53, whereas the upper portion of the shoe is spaced from the rear end of the upper portion of the split die 17, as indicated at 54, to permit the strip 38 to pass therebetween and enter the passage 49 through the die 17. As the strip then moves through the passage 49, it is ironed or smoothed out perfectly flat by the die 17 until it emerges at the forward end of the die which terminates in the mouth of the tapered portion 24 of the passage 22 through the finishing die 21. As will be best seen from Figures 1, 3 and 4, the forward end of the passage 49 projects slightly into the belled mouth 23 of the finishing die 21, at which point the plastic material flowing through the straight-away passage 20 of the die 14 is evenly applied all around the strip. By reason of the balancing of the pressure of the plastic before it is applied onto the strip, as previously explained, the uniformity of application of the plastic coating is closely regulated and accurately maintained.

Now as the strip with the plastic coating thereon advances through the finishing die 21, the tapering of the passage along the part designated 24 causes the plastic to penetrate the strip, in the case of woven fabric, or otherwise fill in irregularities or indentations in the strip and produce a firm bond between the plastic coating and the strip material. Beyond the tapered portion of the passage 22, the coated strip continues through a straight-away portion 25 which completes the smoothing and shaping of the coating to the desired uniform thickness, leaving the strip uniformly coated with the plastic which is firmly bonded thereto without any air bubbles or air pockets in the coating, or between the coating and the strip.

After the coated strip leaves the end of the die or forming head, it may be passed through a water-cooling trough (not shown). It will be understood that the feed of the strip is obtained in any suitable manner, as by exerting a pull thereon from the forward side of the extrusion die or forming head with the aid of a pulley which is preferably driven by a variable speed motor. By careful temperature control of the sections of the die or forming head, and by synchronizing the speed of the plastic machine and the speed of the strip to be covered, the desired plastic coating application can be perfectly regulated. It may also be mentioned in this connection that, if desired, the heat applied to the finishing die by the steam chamber 27 may be in the nature of a superheat to aid in the production of a firm bond between the plastic and the strip to be coated as the strip passes through the tapered portion of the finishing die. By reason of the preheating of the strip by means of the infra-red ray lamps 39, the parts of the extrusion die or forming head are not chilled by the subsequent contact of the strip therewith. This also contributes to the improved quality of the finished product.

It will be understood from the foregoing that by removal of the end plate 29, after removal of the clamping bolts 33, the spider 10, ironing and guiding die 14, and the finishing die 21 may all be removed from the tubular shell 6 for the purposes of cleaning the same when the occasion so requires, or to permit the substitution of other dies of suitable size and shape to conform to the different sizes and shapes of articles to be coated with plastic. Also, by disconnecting the extrusion die or forming head as a unit from the cylinder 2 of the extruding machine, as by unscrewing the head therefrom, convenient access is given to the tapered point 13 to permit the latter to thereafter be unscrewed and removed from the belled or tapered chamber 7. This removal of the tapered point 13, along with the backstop shoe or plug 56, affords convenient access to the interior of the forming head for the purposes of permitting the flexible strip 38 to be threaded through the guides and die parts in advance of the point of entrance of the strip into the split ironing die or guide 17.

By reason of the close regulation or balancing of the pressure and flow of plastic at the approach to the forming die, it is possible by the practice of my invention to flow onto the strip both thin and heavy sections of the plastic coating to form fancy grooves and edgings which enhance the attractiveness of the finished product. Also, my invention makes possible the use of delicate shades of plastic under long continuous runs, without any likelihood of decomposition of the plastic, and consequent darkening and streaking of the final coating which has heretofore been so evident in plastic coated articles of this character. It is to be understood, of course, that while plastics of the vinyl chloride type may be effectively used with my invention, various other plastics may be employed in lieu thereof with equally good results.

Likewise, while the specific details have been herein shown and described, my invention is not confined thereto as changes and alterations may be made without departing from the spirit thereof as defined by the appended claims.

I claim:

1. The method of applying plastic coatings to normally flat flexible strips and the like, which comprises transversely curling the strip preliminary to coating the same, flowing a tubular stream of plastic in a direction generally axially of said stream while maintaining the plastic at such temperature and pressure as to cause the plastic to flow freely, dividing the plastic stream into a plurality of spaced streams at an intermediate point along the path of said stream, advancing the curled strip between the spaced plastic streams from a point exteriorly of the path of the plastic to a point interiorly of the same, recombining the spaced plastic streams to encompass the strip and advancing the strip in a direction generally parallel and coaxial with the flow of the recombined plastic stream while re-flattening and ironing out the curled strip, thereafter depositing the plastic onto the strip in the form of a coating, progressively compressing the plastic coating about the strip during a substantially prolonged period of advancement of the strip, and thereafter smoothing and shaping the plastic coating to the desired shape and thickness during a further substantially prolonged period of advancement of the strip.

2. The method as defined in claim 1, wherein the normally flat strip is transversely curled into a substantially tubular form preliminary to passing the same between the spaced plastic streams.

HERBERT ALTON COOK, Jr.